(12) United States Patent  (10) Patent No.: US 8,767,843 B2
Sayana et al.  (45) Date of Patent: Jul. 1, 2014

(54) EMPLOYING CELL-SPECIFIC AND USER ENTITY-SPECIFIC REFERENCE SYMBOLS IN AN ORTHOGONAL FREQUENCY-DIVISION MULTIPLE ACCESS

(75) Inventors: Krishna Kamal Sayana, Arlington Heights, IL (US); Tyler Brown, Mundelein, IL (US); Colin Frank, Park Ridge, IL (US); XiangYang Zhuang, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 1042 days.

(21) Appl. No.: 12/267,876

(22) Filed: Nov. 10, 2008

(65) Prior Publication Data

US 2010/0118989 A1 May 13, 2010

(51) Int. Cl.
*H04L 27/28* (2006.01)

(52) U.S. Cl.
USPC ............................ 375/260; 375/295; 375/316

(58) Field of Classification Search
CPC .... H04B 7/0632; H04B 7/0639; H04B 7/065; H04B 7/0617; H04B 7/0689; H04L 1/0026; H04L 5/0007; H04L 5/005; H04L 5/0051; H04L 27/2601
USPC ......... 375/260, 267, 285, 295, 296, 316, 340, 375/346, 347
See application file for complete search history.

(56) References Cited

U.S. PATENT DOCUMENTS

| | | | |
|---|---|---|---|
| 8,265,675 B2 | 9/2012 | Matsumoto et al. | |
| 2007/0189240 A1* | 8/2007 | Cho et al. | 370/337 |
| 2007/0223367 A1* | 9/2007 | Wu et al. | 370/216 |
| 2008/0192682 A1 | 8/2008 | Matsumoto et al. | |
| 2008/0232494 A1* | 9/2008 | Pan et al. | 375/260 |
| 2009/0116449 A1* | 5/2009 | Kishiyama et al. | 370/331 |
| 2009/0232309 A1* | 9/2009 | Montojo et al. | 380/270 |
| 2009/0296563 A1 | 12/2009 | Kishiyama et al. | |
| 2010/0040156 A1* | 2/2010 | Patel et al. | 375/260 |
| 2010/0062783 A1* | 3/2010 | Luo et al. | 455/450 |
| 2010/0220668 A1* | 9/2010 | Yamada et al. | 370/329 |

FOREIGN PATENT DOCUMENTS

| | | |
|---|---|---|
| EP | 1898542 A1 | 3/2008 |
| EP | 1983792 A1 | 10/2008 |
| JP | 2007043459 | 10/2008 |
| WO | 2007036787 A2 | 4/2007 |

(Continued)

OTHER PUBLICATIONS

3GPP TS 36.211 V8.3.0; 3rd Generation Partnership Project; Technical Specification Group Radio Access Network; Evolved Universal Terrestrial Radio Access (E-UTRA);Physical Channels and Modulation (Release 9); May 2008.

(Continued)

*Primary Examiner* — Shuwang Liu
*Assistant Examiner* — David S Huang

(57) ABSTRACT

A method, a network base station, and a user communication device for transmitting data on an orthogonal frequency-division multiple access system are disclosed. A network base station may have a common antenna set to transmit on a subcarrier via a first effective channel able to be constructed based on at least one common reference symbol. The network base station may have a dedicated antenna set to transmit on a subcarrier via a second effective channel able to be estimated based on at least one dedicated reference symbol. The user equipment may demodulate a data transmission using the at least one common reference symbol and the at least one dedicated reference symbol.

9 Claims, 11 Drawing Sheets

(56) References Cited

FOREIGN PATENT DOCUMENTS

| WO | WO 2007083728 A1 * | 7/2007 |
|----|----|----|
| WO | 2008/115588 A2 | 9/2008 |
| WO | 2008112803 A2 | 9/2008 |
| WO | 2008115588 | 9/2008 |

OTHER PUBLICATIONS

3GPP R1-073376, "E-UTRA DL L1/L2 Control Channel Design—PICH/AICH/D-BCH", Athens Greece, RAN1#50, Aug. 2007.
International Search Report Issue in Connection With Related PCT Application No. PCT/US2009/060569.
NTT DoCoMo; 3GPP TSG RAN WG1 Ad Hoc on LTE; Pilot Channel and Scrambling Code in Evolved UTRA Downlink; Jun. 20-21, 2005; Sophia Antipolis, France; R1-050589.
Philips; 3GPP TSG RAN WG1; Meeting #48bis; Performance of LTE DL MU MIMO with Dedicated Pilots; Mar. 26-30, 2007; St. Julian's, Malta; R1-071403.
Japan: Notice of Reasons for Rejection, mailed Jun. 7, 2011.
Philips: "Performance of LTE DL MU-MIMO with dedicated pilots", 3GPP TSG RAN WG1 Meeting #48bis Tdoc R1-071403, St. Julian's, Malta, Mar. 26-30, 2007, all pages.
Nortel: "Design Consideration for Higer-order MIMO in LTE-advanced", 3GPP TSG-RAN Working Group 1 Meeting #54bis, R1-083869, Prague, Czech Rep, Sep. 29-Oct. 3, 2008, all pages.

* cited by examiner

Figure 11

Desired Channel 1110 | Interference Channel 120
Phase Data 1112 | Amplitude Data 1114 | Phase Data 1122 | Amplitude Data 1124

PMI 1210 | MCS Index 1220 | CQI 1230 | Rank Indication 1240

*1200*

EMPLOYING CELL-SPECIFIC AND USER ENTITY-SPECIFIC REFERENCE SYMBOLS IN AN ORTHOGONAL FREQUENCY-DIVISION MULTIPLE ACCESS

FILED OF THE DISCLOSURE

The present invention relates to a method and system for transmitting data over an orthogonal frequency-division multiple access connection. The present invention further relates to the use of reference symbols in demodulating a data transmission.

BACKGROUND

The Third Generation Partnership Project (3GPP) is developing a Long Term Evolution (LTE) standard using a physical layer based on globally applicable Evolved Universal Terrestrial Radio Access (E-UTRA). In Release-8 specification of LTE, an LTE base station, referred to as an enhanced Node-B (eNB), may use an array of four antennas to broadcast a signal to a piece of user equipment.

A user communication device, or user equipment (UE), may rely on a pilot or reference symbol (RS) sent from the transmitter for channel estimation, subsequent data demodulation, and link quality measurement for reporting. The link quality measurements for feedback may include such spatial parameters as rank, or the number of data streams sent on the same resources; precoding matrix index (PMI); and coding parameters, such as a modulation and coding scheme (MCS) or a channel quality indicator (CQI). Further, the link quality measurements may be reported on a periodic or aperiodic basis, as instructed by an eNB, in one of the supported feedback modes. The reports may include wideband or subband frequency selective information of the parameters.

SUMMARY

A method, a network base station, and a user communication device for transmitting data on an orthogonal frequency-division multiple network are disclosed. A network base station may have a common antenna set to transmit on a subcarrier via a first effective channel able to be constructed based on at least one common reference symbol. The network base station may have a dedicated antenna set to transmit on a subcarrier via a second effective channel able to be estimated based on at least one dedicated reference symbol. The user communication device may demodulate a data transmission using the at least one common reference symbol and the at least one dedicated reference symbol.

BRIEF DESCRIPTION OF THE DRAWINGS

Understanding that these drawings depict only typical embodiments of the invention and are not therefore to be considered to be limiting of its scope, the invention will be described and explained with additional specificity and detail through the use of the accompanying drawings in which:

FIG. 11 illustrates, in a block diagram, one embodiment of an effective channel.

FIG. 12 illustrates, in a block diagram, one embodiment of a link quality measurement.

DETAILED DESCRIPTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

The present invention comprises a variety of embodiments, such as a method, an apparatus, and an electronic device, and other embodiments that relate to the basic concepts of the invention. The electronic device may be any manner of computer, mobile device, or wireless communication device.

A method, a network base station, and a user communication device for transmitting data on an orthogonal frequency-division multiple network are disclosed. A network base station may have a common antenna set to transmit on a subcarrier via a first effective channel able to be constructed based on at least one common reference symbol. The network base station may have a dedicated antenna set to transmit on a subcarrier via a second effective channel able to be estimated based on at least one dedicated reference symbol. The user communication device may demodulate a data transmission using the at least one common reference symbol and the at least one dedicated reference symbol.

Figure 1:
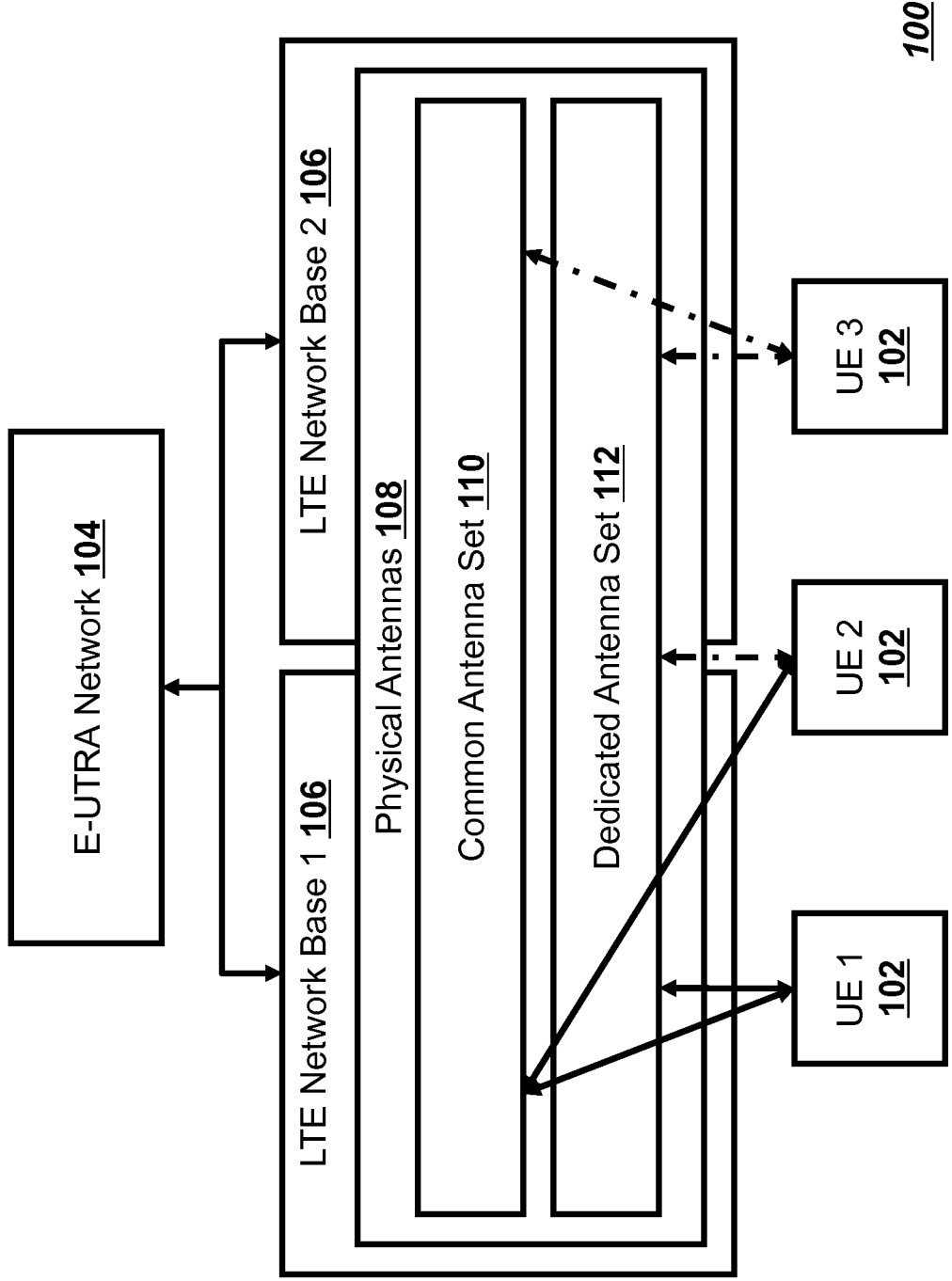
FIG. 1 illustrates one embodiment of a communication system.

FIG. 1 illustrates one embodiment of a Long Term Evolution (LTE) communication system 100. While a LTE carrier communication system 100 is disclosed, other types of communication systems may use the present invention. A LTE user equipment (UE) 102 may access a telecommunications network 104 via a LTE network base station 106. Various communication devices may exchange data or information through the network 104. The network 104 may be an evolved universal terrestrial radio access (E-UTRA) network, or other type of telecommunication network. For one embodiment, the UE may be one of several types of handheld or mobile devices, such as, a mobile phone, a laptop, or a personal digital assistant (PDA). For one embodiment, the UE may be a WiFi® capable device, a WiMAX® capable device, or other wireless devices.

In FIG. 1, the network base station 106 may have a complete set or partial set of physical antennas 108 for making a data transmission to the UE 102. A network base station 106 with a partial set of physical antennas may coordinate with one or more other network base stations 106 to make the data transmission. A data transmission may be the act of sending data, regardless of the type of data or the form of the transmission. A data transmission may encompass one or more data streams via one or more effective channels. An antenna port may be associated with an actual or effective channel observable to a UE 102. One physical antenna 108 may map directly to a single antenna port, in which an antenna port corresponds to an actual physical antenna. The physical antennas and the corresponding antenna ports may be referred to interchangeably for the purposes of this invention. Alternately, a set or subset of physical antennas 108, or antenna set 108, may be mapped to one or more antenna ports after applying complex weights, a cyclic delay, or both to the signal on each physical antenna 108. The physical antenna set 108 may have antennas from a single base station 106 or from multiple base stations 106. The weights may be fixed as in an antenna virtualization scheme, such as cyclic delay diversity (CDD). The associated pilots may be common to all UE 102. The procedure used to derive antenna ports from physical antennas 108 may be specific to a base station 106 implementation and transparent to the UE 102.

The base station 106 may transmit a signal on an orthogonal frequency division multiplexing (OFDM) subcarrier to a UE 102 via weighting each antenna signal with a complex value, an operation referred to as precoding, which may be mathematically represented by the matrix equation:

$$Y = HVs + n$$

in which, when transmitting one data stream, or rank-1, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_1 \\ \vdots \\ v_{N_T} \end{bmatrix} s + n$$

in which, when transmitting two data streams, or rank-2, may be represented as:

$$\begin{bmatrix} y_1 \\ \vdots \\ y_{N_R} \end{bmatrix} = \begin{bmatrix} h_{1,1} & \cdots & h_{1,N_T} \\ \vdots & \ddots & \vdots \\ h_{N_R,1} & \cdots & h_{N_R,N_T} \end{bmatrix} \begin{bmatrix} v_{1,1} & v_{1,2} \\ \vdots & \vdots \\ v_{N_T,1} & v_{N_T,2} \end{bmatrix} \begin{bmatrix} s_1 \\ s_2 \end{bmatrix} + n$$

Where $y_1 \ldots y_{N_R}$ may be received data at the UE receive antenna #1 to #$N_R$, respectively. In the embodiment with a rank-1 transmission, or a transmission with one data stream denoted as "s", V may be a precoding vector with weights $v_1 \ldots v_{N_T}$ for base station 106 transmit antenna #1 to #$N_T$, respectively. In an embodiment with a rank-2 transmission, or a transmission with two data streams s1 and s2 on the same subcarrier, V may be a precoding matrix. Matrix H may be the propagation channel matrix between transmit antennas and receive antennas, with entry $b_{ij}$ representing a channel between the jth transmit and ith receive antennas. Value n may represent noise and interference. The precoding weights V, either a vector or matrix, may be determined by the base station, typically based on the channel particular to the UE, or UE-specific. The precoding weights may or may not be constrained to a predefined codebook that consists of a set of pre-defined vectors or matrices. In an embodiment with constrained precoding, the precoding matrix may be signaled efficiently with a precoding matrix index (PMI), or an index to a precoding matrix within the predefined codebook. The term "matrix" may include the degenerated special case of vector. In the most generic sense, the term "precoding" may refer to any possible transmission scheme that may be deemed as mapping a set of data streams to an antenna set using a matrix V. The term "precoding" may include an "open-loop" transmission as a special "precoding" with unweighted antennas and any antenna virtualization schemes, such as cyclic delay diversity (CDD).

Common reference symbols (CRS) or cell-specific reference symbols may be sent from the base station intended for all UE in the cell. The CRS location and pattern may differ from cell to cell, thus the term "cell-specific", but they can be used by all UEs in the cell, thus the term "common". CRS may correspond to physical antenna ports or "virtual" antenna ports where the virtualization process may have a group of radiating elements transmitting the same signal in a fixed manner. In a virtualization process, the signal may be pre-determined based on a base station implementation, but otherwise common and transparent to all UE.

Dedicated reference symbols (DRSs), or user-specific pilots, may be intended for a particular UE. In a typical operation, a DRS may be embedded within the user's allocation, such as subcarriers or subbands assigned to a user. A DRS typically may correspond to precoded reference symbols, where precoding may be performed in a similar way to precoding on data symbols. The applied precoding may be specific to a UE and could be based on corresponding feedback from the UE or channel measurements at a base station.

To decode the precoded data, a UE may estimate the channel as experienced by the data symbols, such as an effective or equivalent channel as seen by the UE. The effective channel in general may be deemed as the channel between at least one data stream and the received signal, and may include the effect of precoding if applied. So in mathematical form, the effective channel may be a matrix with the dimension depending on the number of data streams. Hence, the term "effective channel" and "effective channel matrix" may be used interchangeably. In the example of the precoding operation as expressed in the previous equation, the effective channel matrix for data demodulation may be HV. The dimensionality of the effective channel matrix may be determined by the number of receive antennas at the UE and the rank, or number of data streams transmitted. In an embodiment with a data transmission with a rank equal to or greater than two, the effective channel matrix may have a set of sub-matrices corresponding to a subset of data streams. The effective channel matrix may be derived at the UE by estimating the propagation channel matrix H and a known precoding matrix V as applied. The effective channel matrix may also be derived by estimating the effective channel directly.

Conventionally, a UE may rely on either a CRS or a DRS to demodulate the received data, but not both. Demodulation of received data may refer to the receiver process of extracting, from the received signal, some kind of metrics for each of the transmitted bits for further decoding. The metric may be a bit-level confidence metric such as a log-likelihood ratio (LLR) or a similar metric used for, for example, turbo decoding. Demodulation may use knowledge of the effective channel obtained from either the CRS or DRS. For example, a CRS may enable the UE to estimate the channel corresponding to an antenna port. The base station may signal the applied PMI on the downlink. With the knowledge of PMI, the effective channel may be constructed based on at least one CRS. A UE may estimate the effective channel directly from a DRS without having to know the precoding weights. When transmitting DRS, the base station may have additional flexibility to apply unconstrained precoding weights, as these precoding weights need not be signaled to the UE. A CRS may still be transmitted for measurement purposes at the UE, instead of demodulation purposes. Measurements may include the link quality measurements as well as received power measurements useful for handover.

In FIG. 1, the UE may receive CRS that corresponds to one or more antenna ports associated with a common antenna set 110. The UE may also receive DRS that are specific to the UE. The DRS may correspond to one or more antenna ports associated with a dedicated antenna set 112. As opposed to a common antenna set, the dedicated antenna set may have antennas used in the data transmission to a specific UE. A common antenna set 110 and a dedicated antenna set 112 may have one or more physical or virtual antennas. A common antenna set 110 and a dedicated antenna set 112 may be distinct from each other. Alternately, a common antenna set 110 and a dedicated antenna set 112 may have at least one antenna in common. A common antenna set 110 may encompass antennas on more than one base station 106. A dedicated antenna set 112 may encompass antennas on more than one base station 106. A first base station 106 may have an antenna of the common antenna set 110 and a second base station 106 may have an antenna of the dedicated antenna set 112.

A UE may receive a CRS or a DRS sent from a first network base station such as its serving base station. A UE may further receive at the same time a CRS or a DRS sent from a second network station in the example of coordinated multipoint transmission. A coordinated multipoint transmission is a transmission scheme in which more than one base station may transmit simultaneously to the same UE. The UE may use the combined information of both effective channels for decoding data. In a coordinated multipoint operation, a UE may receive reference symbols from a common antenna set and also from a dedicated antenna set.

A base station may use a common antenna set to transmit on a subcarrier via a first effective channel. A UE may be able to construct the first effective channel based on at least one CRS. The base station may use the first effective channel to transmit to a first user device. The base station may use a dedicated antenna set to transmit on the subcarrier via a second effective channel. A UE may be able to construct the second effective channel based on at least one DRS. The base station may use the second effective channel to transmit to a first user device. Alternately, the base station may use the second effective channel to transmit to a second user device.

Figure 2:
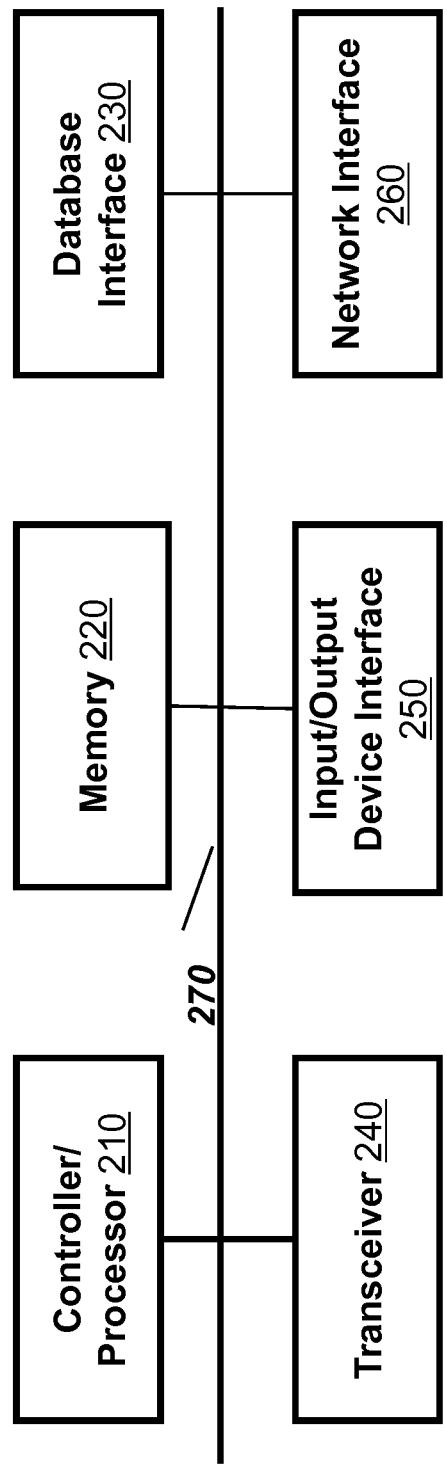
FIG. 2 illustrates a possible configuration of a computing system to act as a base station.

FIG. 2 illustrates a possible configuration of a computing system to act as a base station 106. In FIG. 2, the base station includes a controller/processor 210, a memory 220, a database interface 230, a transceiver 240, input/output (I/O) device interface 250, and a network interface 260, connected through bus 270. The base station may implement any operating system, such as Microsoft Windows®, UNIX, or LINUX, for example. Client and server software may be written in any programming language, such as C, C++, Java or Visual Basic, for example. The server software may run on an application framework, such as, for example, a Java® server or .NET® framework.

The base station controller/processor may be any programmed processor known to one of skill in the art. However, the decision support method may also be implemented on a general-purpose or a special purpose computer, a programmed microprocessor or microcontroller, peripheral integrated circuit elements, an application-specific integrated circuit or other integrated circuits, hardware/electronic logic circuits, such as a discrete element circuit, a programmable logic device, such as a programmable logic array, field programmable gate-array, or the like. In general, any device or devices capable of implementing the decision support method as described herein may be used to implement the decision support system functions of this invention.

The base station memory may include volatile and non-volatile data storage, including one or more electrical, magnetic or optical memories such as a random access memory (RAM), cache, hard drive, or other memory device. The memory may have a cache to speed access to specific data. The memory may also be connected to a compact disc-read only memory (CD-ROM), digital video disc-read only memory (DVD-ROM), DVD read write input, tape drive, or other removable memory device that allows media content to be directly uploaded into the system.

Data may be stored in the memory or in a separate database. The base station database interface may be used by the controller/processor to access the database. The database may contain any formatting data to connect the UE to the network.

The base station transceiver may create a data connection with the UE. The transceiver may use the antenna set via a CRS port or a DRS port to create a downlink and uplink control channel and a downlink and uplink data channel between the base station and the UE.

The I/O device interface of the base station may be connected to one or more input devices that may include a keyboard, mouse, pen-operated touch screen or monitor, voice-recognition device, or any other device that accepts input. The I/O device interface may also be connected to one or more output devices, such as a monitor, printer, disk drive, speakers, or any other device provided to output data. The I/O device interface may receive a data task or connection criteria from a network administrator.

The base station network connection interface may be connected to a communication device, modem, network interface card, a transceiver, or any other device capable of transmitting and receiving signals from the network. The network connection interface may be used to connect a client device to a network. The components of the base station may be connected via an electrical bus, for example, or linked wirelessly.

Client software and databases may be accessed by the base station controller/processor from memory, and may include, for example, database applications, word processing applications, as well as components that embody the decision support functionality of the present invention. The base station may implement any operating system, such as Microsoft Windows®, LINUX, or UNIX, for example. Client and server software may be written in any programming language, such as C, C++, Java or Visual Basic, for example. Although not required, the invention is described, at least in part, in the general context of computer-executable instructions, such as program modules, being executed by the electronic device, such as a general purpose computer. Generally, program modules include routine programs, objects, components, data structures, etc. that perform particular tasks or implement particular abstract data types. Moreover, those skilled in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like.

Figure 3:
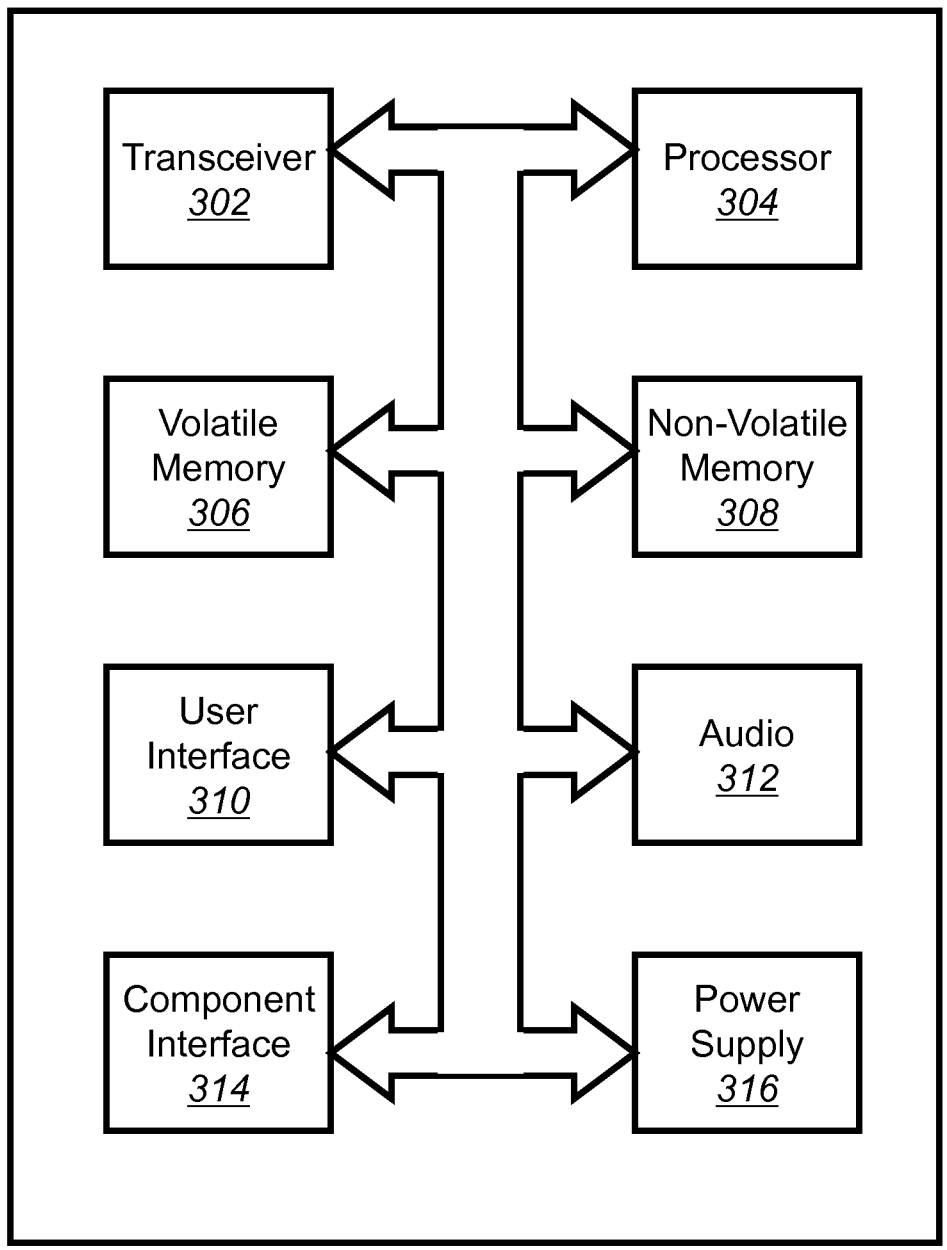
FIG. 3 illustrates in a block diagram for one embodiment of the user communication device.

FIG. 3 illustrates in a block diagram one embodiment of a user communication device 300, or terminal, capable of acting as a UE 102. The UE 300 may be capable of accessing the information or data stored in the network. For some embodiments of the present invention, the UE 300 may also support one or more applications for performing various communications with the network. The UE 300 may be a handheld device, such as, a mobile phone, a laptop, or a personal digital assistant (PDA). For some embodiments of the present invention, the UE 300 may be WiFi® capable device, which may be used to access the network for data or by voice using VOIP.

The UE 300 may include a transceiver 302, which is capable of sending and receiving data over the network. The UE 300 may include a processor 304 that executes stored programs. The UE 300 may also include a volatile memory 306 and a non-volatile memory 308 which are used by the processor 304. The UE 300 may include a user input interface 310 that may comprise elements such as a keypad, display, touch screen, and the like. The UE 300 may also include a user output device that may comprise a display screen and an audio interface 312 that may comprise elements such as a microphone, earphone, and speaker. The UE 300 also may include a component interface 314 to which additional elements may be attached, for example, a universal serial bus (USB) interface. Finally, the UE 300 may include a power supply 316.

Figure 4:
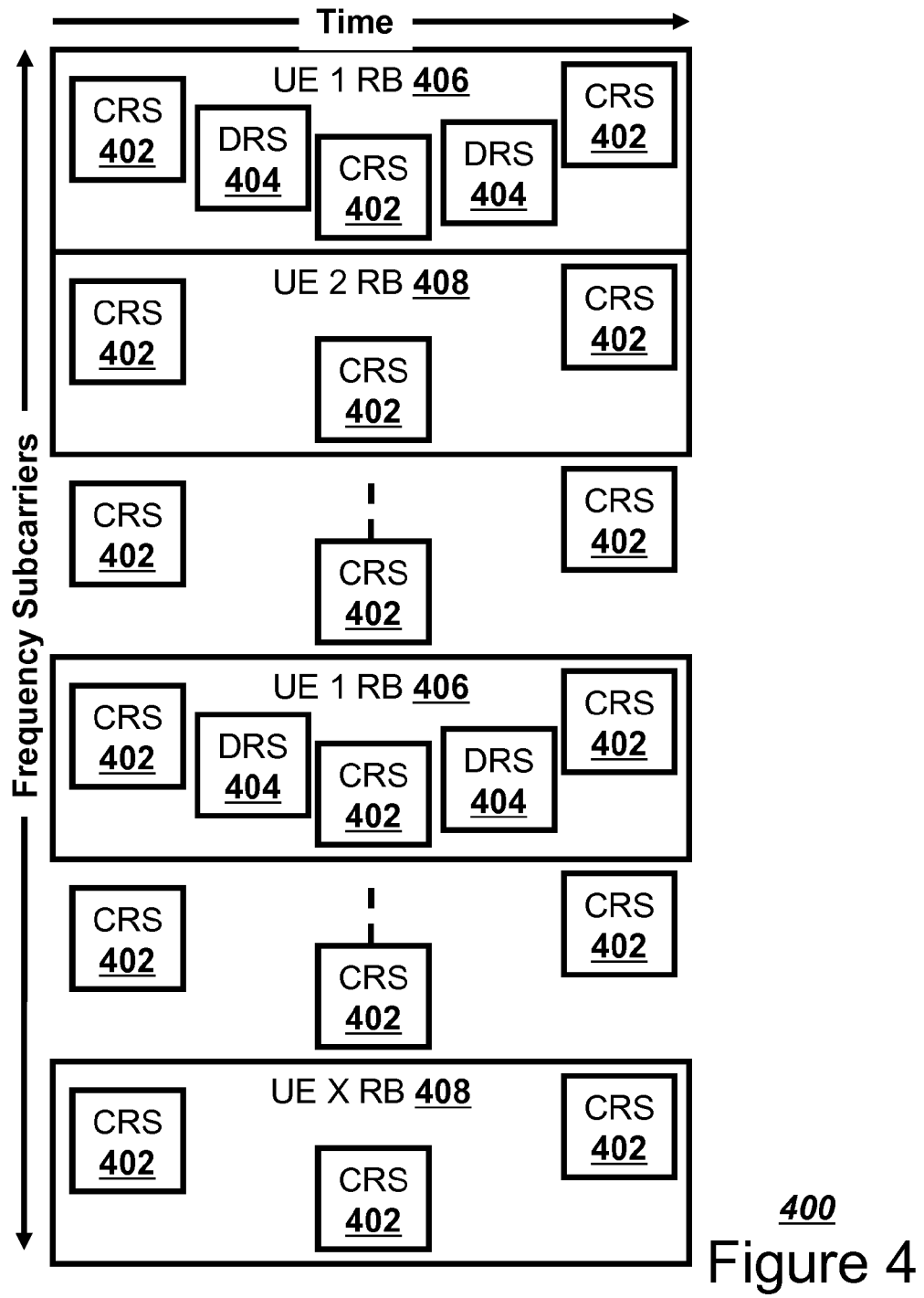
FIG. 4 illustrates one embodiment of a frame structure in an orthogonal frequency division multiplexing system.

FIG. 4 illustrates one embodiment of a frame structure in an OFDM system 400. A base station may send reference symbols in both time and frequency subcarrier domains to enable UE to obtain channel knowledge in both domains for demodulation. A subset of CRS 402 corresponding to an antenna port may be scattered across the entire system bandwidth to allow UE to estimate one channel for the whole band. If CRS 402 are used by the UE for data demodulation, the subset of CRS 402 may be scattered across the time slot, or frame, so that the UE may also track the time-variation of the channel. DRS 404 may be sent to enable a particular UE or a subset of the UE to obtain a specific effective channel. To accomplish this, the base station may embed DRS 404 in the user-specific allocation resource regions. Subcarrier resources in time and frequency domain may be divided into some basic unit, such as a resource block (RB). A UE-specific allocation may occupy either a contiguous or non-contiguous set of resource blocks. A heterogeneous RB 406 may contain both a CRS 402 and a DRS 404, while a homogenous RB 408 may contain just CRS 402 or just DRS 404.

Figure 5:
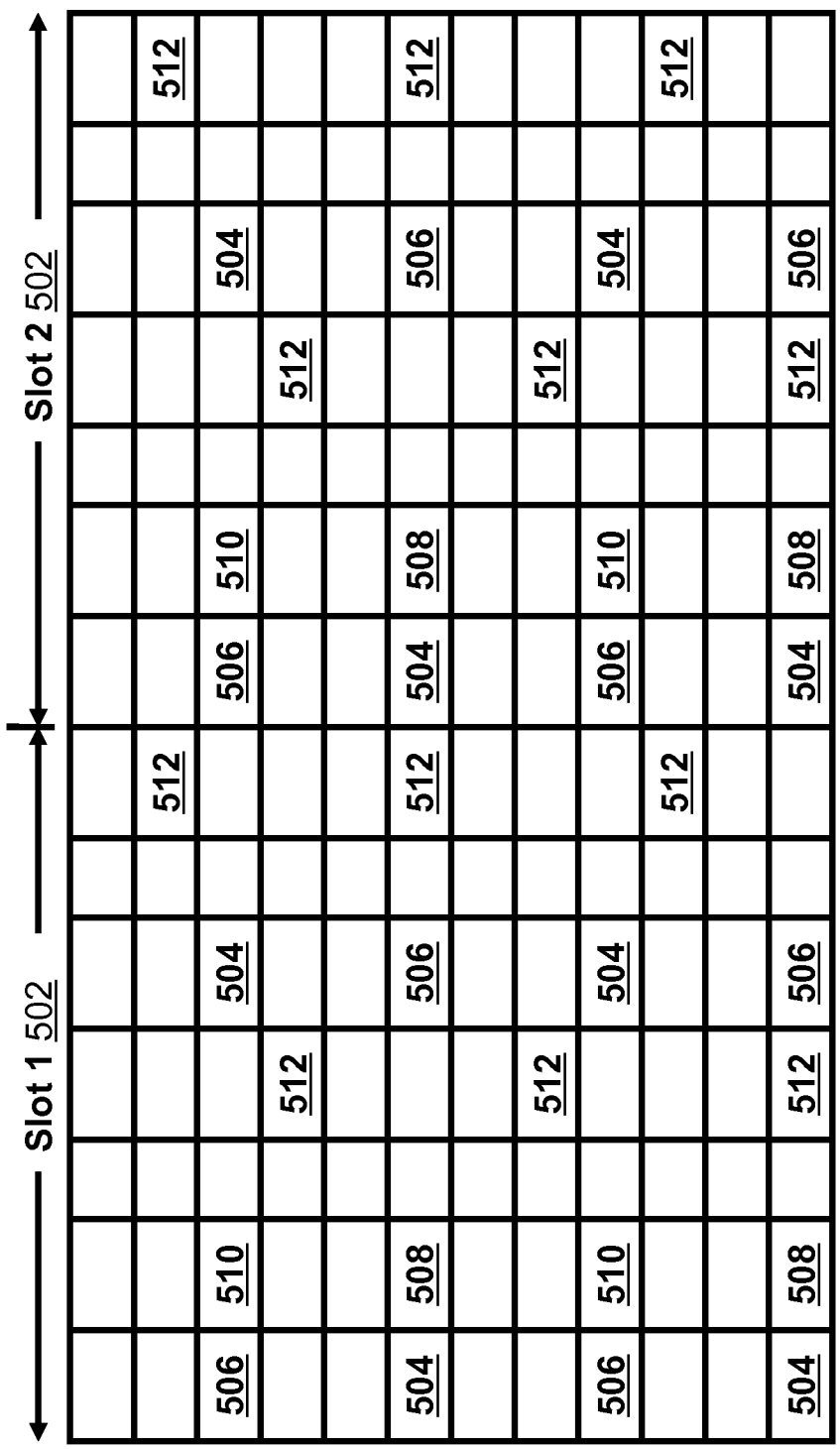
FIG. 5 illustrates, in a block diagram, one embodiment of a resource block.

FIG. 5 illustrates, in a block diagram, one embodiment of a RB 500. A RB in the LTE specification may span a slot with two slots 502 forming a subframe. CRS locations within an RB 500 may be divided into several subsets with each being associated with a different antenna port. For example, an RB 500 may have a first CRS subset 504 associated with an antenna port #0 and a second CRS subset 506 associated with an antenna port #1, respectively with each subset having four locations in an RB 500. Further, the RB 500 may have a third CRS subset 508 associated with an antenna port #2 and a fourth CRS subset 510 associated with an antenna port #3. In addition to any CRS transmitted from the base station, additional DRS may also be transmitted within the UE-specific allocation. The RB 500 may have a set of DRS 512, in this example six DRS 512, associated with antenna port #5. The antenna port #5, rather than being an actual antenna, may correspond to the effective channel seen at the UE after the base station applied precoding on a set of physical antennas.

From the UE perspective, a reference symbol may be sent from an antenna port via a corresponding channel, but the reference symbol may actually be sent from all or a subset of the physical antennas in precoding operation. The precoding may take the form of beamforming, where a vector of weights may be applied to a dedicated antenna set to obtain an effective channel.

An UE may make measurements and aid the base station 106 in determination of spatial parameters for that UE, through appropriate feedback derived from the common antenna ports. Such feedback may be used to dynamically apply UE specific weights to improve performance. A base station may obtain the spatial parameters without any UE feedback, for example in a time division duplexing (TDD) system, using uplink-downlink channel reciprocity. Two types of data demodulation operations may be performed at the UE based on a CRS 402 or DRS 404.

Figure 6:
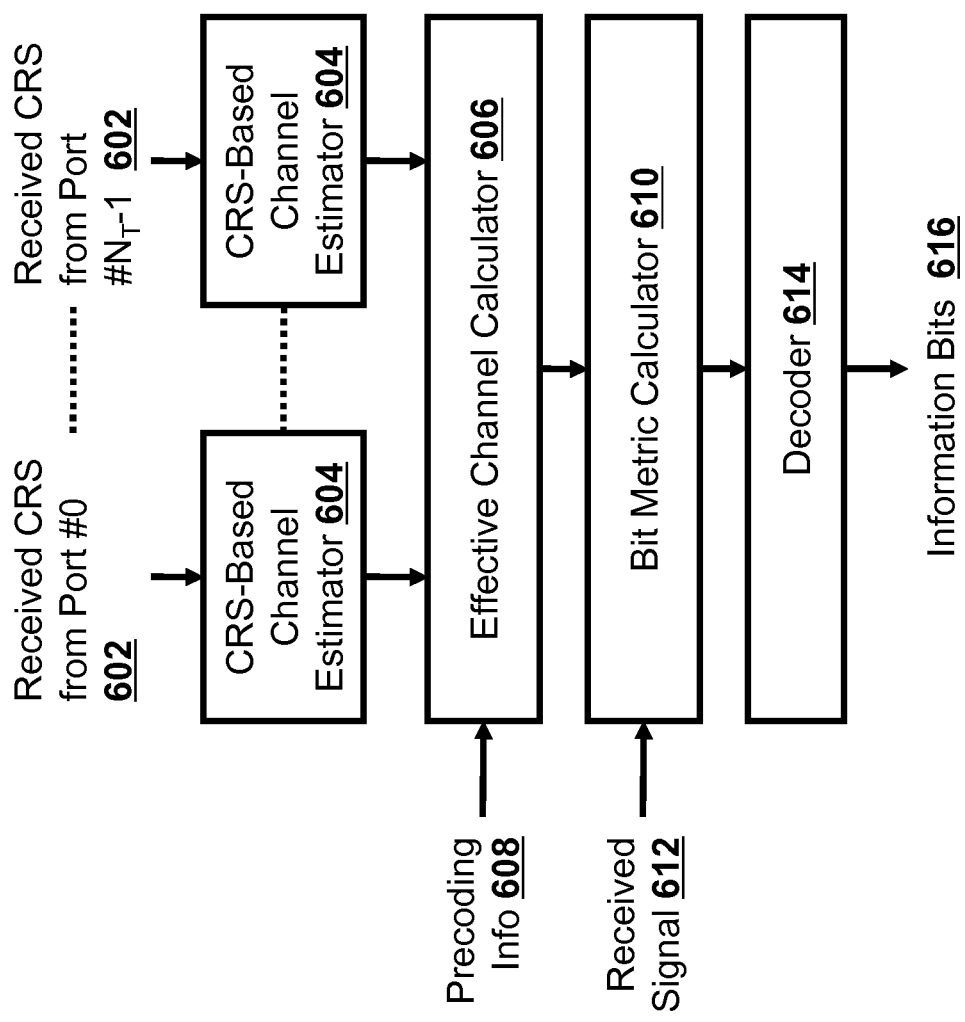
FIG. 6 illustrates, in a block diagram, one embodiment for common reference symbol based demodulation.

FIG. 6 illustrates, in a block diagram, one embodiment for CRS based demodulation 600. In a CRS-based approach, the UE may receive a subset of CRS 602 corresponding to antenna port #0 and may then feed the subset of CRS 602 to the CRS-based channel estimator 604 to obtain the channels over frequency and time corresponding to antenna #0. Similarly, the UE may perform processing for subsets of CRSs 602 corresponding to antennas #1 through #$N_T$-1. The effective channel calculator 606 may use the channels from the channel estimator 604 for each antenna port to construct the effective channel for each of the precoded data streams, based on precoding information 608 signaled to the UE. Precoding information may convey transmission parameters, such as precoding weights, in the form of PMI. Referring back to the Rank-2 equation, the CRS-based estimates of channels from each UE receive antenna to each base station transmit antenna may be represented in a matrix form H. The bit metric calculator 610 may use the effective channel HV and received signal 612 to compute a bit metric for each transmitted bit on each data stream. The resulting signal model relating data symbols to the received signal on each subcarrier may represent well-known single-input multiple-output (SIMO) or multiple-input multiple-output (MIMO) models, based on which the receiver processing may be either linear processing like maximal ratio combining (MRC), minimum mean square error (MMSE), or non-linear processing like maximum-likelihood (ML) decoding. A decoder 614 may process such bit metrics to obtain information bits 616.

While CRS-based demodulation may forgo using any DRS 404, the UE may use knowledge of precoding applied at the base station in order to construct the effective channel. The base station may convey this precoding information concurrent to instructing the UE of the base station's allocation. To reduce overhead, the base station may constrain precoding weights to be from a predefined set of vectors or matrices. For example in a LTE specification, the base station may predefine a set of 16 matrices for two-stream, or rank-2, precoding for an embodiment with $N_T$=4 transmit antennas. The base station may signal the PMI, represented as a 4-bit binary value, to notify a UE of the corresponding precoding weights used for the base station's data. In many instances, constraining the precoding weights to a codebook may lead to performance loss due to quantization. To avoid this loss, the base station may employ DRS 404 to enable a UE to directly estimate the effective channel corresponding to each precoded stream. The use of DRS 404 may allow the base station to apply an unquantized, thus more, optimal precoding matrix.

Figure 7:
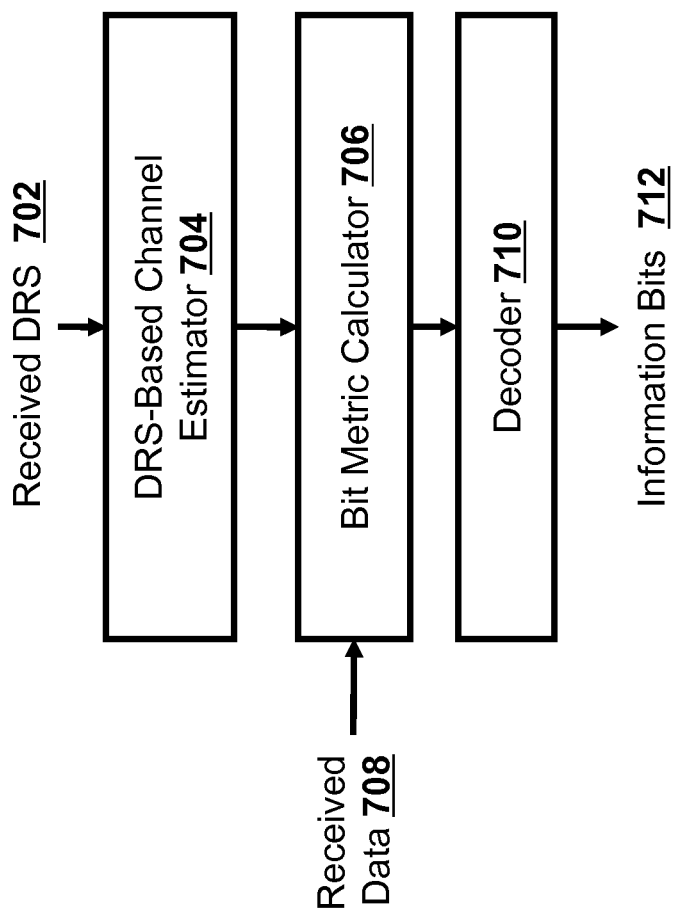
FIG. 7 illustrates, in a block diagram, one embodiment for dedicated reference symbol based demodulation.

FIG. 7 illustrates, in a block diagram, one embodiment for DRS based demodulation 700. The UE may feed a received DRS 702 corresponding to a data stream into a DRS-based channel estimator 704. The UE may feed received DRS 702 corresponding to additional data streams into additional DRS-based channel estimator. A bit metric calculator 706 may use the effective channel matrix from the at least one channel estimator 704 and the received data 708 to compute a bit metric for each transmitted bit on each data stream targeted to the UE. A decoder 710 may process such bit metrics to obtain information bits 712. Since a UE does not have any knowledge of precoding applied at the base station, the UE may rely on a DRS 702 instead of a CRS 402 for demodulation, even though the UE may still use the CRS 402 for measurement purposes as described previously.

Even when a DRS 404 is used, the base station may still send CRS 402 due to any number of other requirements, such as decoding broadcast transmissions intended for all UE in the system where the broadcast transmission contains common control information, enabling a UE to measure the channel matrix, and serving some UE with pre-defined precoding. Typically, the base station may send DRS 404 as additional pilots to the CRS 402, resulting in overhead increase. In the example of the LTE specification with $N_T=4$, CRS may take 1/7=14.3% of the total subcarriers and DRS may take another 1/14=7.1% of the total subcarriers. The performance gain achievable with unconstrained precoding may come at the cost of additional pilot overhead.

Figure 8:
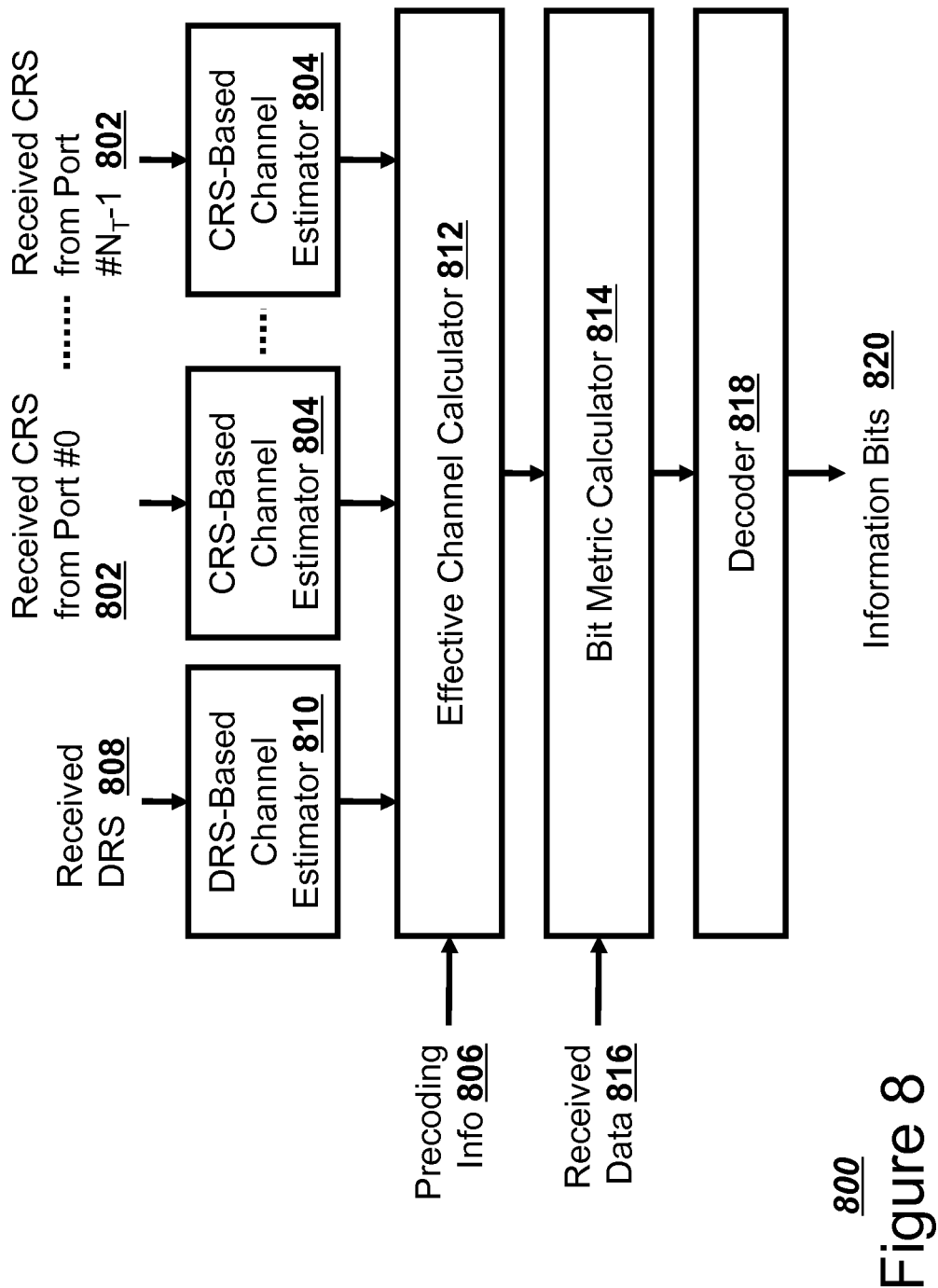
FIG. 8 illustrates, in a block diagram, one embodiment for a combination common reference symbol and dedicated reference symbol based demodulation.

FIG. 8 illustrates, in a block diagram, one embodiment for a combination CRS and DRS based demodulation 800. A UE may feed a CRS 802 from an antenna port #0 to a channel estimator 804 to estimate a channel corresponding to antenna port #0. Similarly, other channels corresponding to other antenna ports may be estimated based on other CRS 802. At the same time, the UE may feed received DRS 808 to one or more DRS-based channel estimator 810.

The effective channel calculator 812 may construct the effective channel matrix corresponding to at least one data stream, based on the output of one or more DRS-based channel estimator 810 and of one or more CRS-base channel estimator 804. The construction of the effective channel may also use the precoding information 806. The bit metric calculator 814 may use the constructed effective channel matrix and received data 816 to compute bit metrics for the at least one data stream before a decoder 818 further decodes the bit metrics into information bits 820.

The effective channel matrix constructed at the effective channel calculator 812 may have a first effective channel sub-matrix and a second effective channel sub-matrix. At least one data stream may be sent via the first effective channel that may be constructed based on the channel estimated by CRS-based channel estimator 804. The first set of data streams may refer to one or more data streams. The first set of data streams may be transmitted with an open-loop scheme or a precoding scheme under the PMI constraint, where known precoding information 806, such as PMI, may be used by the UE. At least one data stream may be sent via the second effective channel estimated directly by the DRS-based channel estimator 810. The second set of data streams may refer to one or more data streams.

The first and second set of data streams may be identical, distinct, or partially identical. The joint set of data streams may be intended for a single UE or multiple UE. In the latter embodiment, the first effective channel sub-matrix may correspond to the first set of data streams intended for a first UE, and the second effective channel sub-matrix may correspond to the second set of data streams intended for a second UE. The first UE or the second UE may demodulate the data transmission intended for itself, while treating the other data streams as interference. If the entire effective channel matrix is constructed, the UE may employ an interference cancellation receiver.

Figure 9:
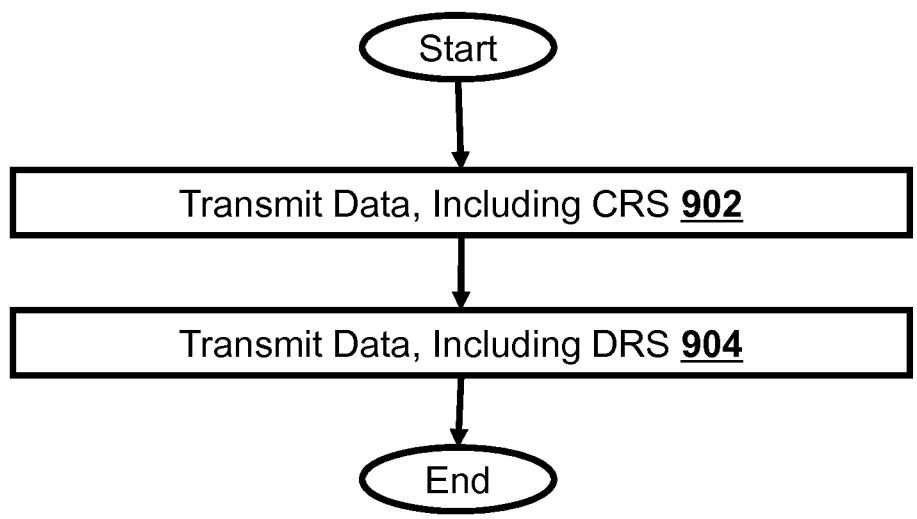
FIG. 9 illustrates, in a flowchart, one embodiment of a method for transmitting data along with reference symbols.

FIG. 9 illustrates, in a flowchart, one embodiment of a method 900 for transmitting data along with reference symbols. The network base station may use a common antenna set to transmit data, including at least one CRS, on a subcarrier via a first effective channel (Block 902). The first effective channel sub-matrix may be constructed based on the at least one CRS. The network base station may use a dedicated antenna set to transmit data, including at least one DRS, on the subcarrier via a second effective channel (Block 904). The network base station may send the data as a frequency division duplexing (FDD) transmission or a TDD transmission. A common antenna set and a dedicated antenna set may have one or more physical or virtual antennas. A common antenna set and a dedicated antenna set may be distinct from each other, or have at least one antenna in common.

Employing both CRS 402 and DRS 404 for UE demodulation may be useful when dealing with an added number of transmitter antennas at the network base station. In the particular example of the E-UTRA specification in the Third Generation Partnership Project (3GPP), such as the LTE Release-8 specification, four transmitters may be supported by a network base station. The network base station may transmit a CRS 402 corresponding to each of the four transmitter antennas, enabling the UE to estimate the corresponding channel to each of the four antennas. The UE may determine an optimal 4-antenna precoding weights, and may feed that information back to the network base station in the form of a PMI.

If a network base station increases the number of physical antennas to eight, the network base station may potentially deliver a larger precoding gain than what a four transmitter network base station may deliver. However, a legacy UE may receive CRS 402 corresponding to up to four antenna ports and is unable to process CRS 402 corresponding to eight antenna ports. In this embodiment, a transmission to a UE that demodulates data based on both CRS 402 and DRS 404 may deliver a better precoding performance than a transmission that relies on only CRS 402 for demodulation. Similarly, incurred overhead may be lower than a transmission scheme that relies on DRS only.

A network base station may map a common antenna set of all the eight antennas to four virtual antenna ports, each associated with a set of CRS 402. For example, the base station may pair two physical antennas via a Cyclic Delay Diversity (CDD) scheme to form a virtual antenna port. The base station 106 may apply weights onto the resulting four virtual antenna ports from which a first set of data streams is sent to individual UE. The PMI recommendation of the UE may also be derived based on the assumption that precoding may be applied to the four virtual antennas.

For a second set of data streams, the base station may use a dedicated antenna set that has all eight antennas. The base station may perform more optimal eight transmitter precoding with a precoding matrix matched to the spatial channels corresponding to all eight antennas, rather than matched to the channels of the four virtual antennas. If the base station is unable to provide CRS 402 for all the eight antennas, the UE may rely on the DRS 404 to obtain the effective channel.

By having the UE demodulate data using both CRS 402 and DRS 404, the network base station may support, as an example, a rank-2, or two data stream operation, even when the DRS pattern is defined for a single stream. The network base station 106 may notify the UE that the first stream is sent using a suboptimal scheme with precoding applied on the four virtual antenna and the second stream may utilize a more optimal true eight transmitter precoding scheme. While the first effective channel sub-matrix corresponding to the first stream may be constructed based on the CRS 402, the second effective channel sub-matrix corresponding to the second stream may be estimated from DRS 404. Using both CRS 402 and DRS 404 may provide an alternative to the conventional, but more optimal, rank-2 DRS-only design at a lower pilot overhead, though often at a possible performance loss as well. Compared to the CRS-only design, the additional overhead of introducing DRS 404 may be justified by improved performance for the second stream based on DRS 404, due to the possibility of using an unconstrained precoding strategy for that stream. The complexity of a UE receiver processing, from the perspective of channel estimation, may be unchanged from the scenario where rank-1 DRS 404 may be received. The CRS-based channel estimation may be supported already to meet the measurement requirements.

In one embodiment, a common antenna set may have $N_T^{CRS} < N_T$ antennas as a subset of the available $N_T$ transmitter antennas. The channel sub-matrix $H_c$ corresponding to the common antenna set may have a size of $N_R \times N_T^{CRS}$ with $N_R$ being the number of receiver antennas. The UE may obtain a first effective channel sub-matrix $H_a$ that is constructed based on $H_c$ and the signaled PMI V, which is a $N_T^{CRS} \times N_S^{CRS}$ matrix with $N_S^{CRS}$ being the number of data streams that is sent using PMI-based precoding, such as $H_a = H_c V$. The UE may obtain a second effective channel sub-matrix an $H_b$ of a size $N_R \times N_S^{DRS}$ based on the DRS 404 directly, with $N_S^{DRS}$ being the number of data streams using unconstrained precoding and $H_b$ having a dimension of $N_R \times N_S^{DRS}$, for example.

In general, the received signal model at the UE may be represented as $Y = H_a S + H_b S'$, where S and S' are the first and second sets of data streams, respectively. The first and second set of data streams may be same, distinct, or have a partial overlap and may have a different number of streams. If S=S', the number of data streams transmitted may be $N_S^{DRS}$ which is equal to $N_S^{CRS}$. The CRS 402 may be used together with DRS 404. In this scenario, $H_a + H_b$ may be the effective channel which depends on both CRS 402 and DRS 404.

If S and S' are distinct, however, the number of total data streams intended for the UE may be $N_S^{DRS} + N_S^{CRS}$, assuming $N_R$ is greater than this number. The generalized signal model for this embodiment may be written as $Y = [H_a\ H_b][S^T\ S'^T]^T$ where superscript "T" denotes a matrix transpose and $[H_a\ H_b]$ may be the full effective channel matrix with sub-matrices obtained from CRS 402 and DRS 404. The variable $[S^T\ S'^T]^T$ may be the plurality of data streams associated with CRS 402 and DRS 404. The first and second sets of data streams, S and S', may also have a partial overlap. As to precoding, the precoding matrix V may be a general $N_T \times (N_S^{CRS} + N_S^{DRS})$ matrix with no requirements that any of the entries be zeros, referred to as the unlimited case. In one embodiment, the physical antennas may be divided into two antenna subsets with corresponding channel sub-matrices, with the channels from all physical antennas to receive antennas denoted as $H = [H_1\ H_2]$. The UE may estimate part of this channel from CRS 402 and part of the channel from a separately signaled low-density CRS 402. The unlimited precoder matrix may be represented by blocks of sub-matrices as follows $$V = \begin{bmatrix} V_{11} & V_{12} \\ V_{21} & V_{22} \end{bmatrix},$$

where $V_{ij}$ may represent a precoder matrix from antenna set i to data stream set j. In one embodiment, each set of data streams may have an equal number of data streams. In one example, the precoding matrix may be of the limited form $$V = \begin{bmatrix} V_{11} & 0 \\ 0 & V_{22} \end{bmatrix},$$

where $V_{11}$ may be constrained to the PMI to be applied to CRS 402 and signaled to the UE and $V_{22}$ may be an unconstrained precoding. The network base station may use a separate precoder for each subset of antennas that correspond to CRS and DRS 404 respectively, though these precoders may be determined jointly. In one embodiment, the common antenna set and the dedicated antenna set may be distinct, with the common antenna set having antennas 1 through $N_T^{CRS}$ and the dedicated antenna set having antennas $N_T^{CRS} + 1$ to $N_T$.

In another example of a limited precoder, an upper block triangular matrix $$V = \begin{bmatrix} V_{11} & V_{12} \\ 0 & V_{22} \end{bmatrix},$$

may also be used to give a model for the signal received at the UE, as $$Y = [H_1 V_{11} S + (H_1 V_{12} + H_2 V_{22}) S']$$

where S may be a $N_S^{CRS} \times 1$ vector of data streams associated with CRS and S' may be a $N_S^{CRS} \times 1$ vector of data streams associated with DRS 404. This signal model may arise when CRS 402 are sent from a subset of transmit antennas, or common antenna set, while the DRS 404 may be sent from all the transmit antenna ports, or dedicated antenna set, that may include the common antenna set.

The CRS 402 may be used to estimate the $N_R \times N_T^{CRS}$ channel $H_1$ and the UE may construct a first effective channel sub-matrix $H_1 V_{11}$. DRS may be used to estimate a second effective channel sub-matrix $H_1 V_{12} + H_2 V_{22}$ with a size of $N_R \times N_S^{DRS}$. $V_{11}$ may be signaled as a PMI by the network base station. With this approach, the second set of data streams may get a larger gain than the first set of data streams. Optionally, the power allocated to each set of data streams and the number of data streams allocated to each set may be optimized to provide performance gains.

As to the precoding weights applied at the network base station 106, some precoding schemes may be based on some long-term channel statistics, may use random precoding, or may rotate through the precoding defined in a codebook. Alternately, the network base station may use channel state information aware beamforming. The network base station may receive channel information from an uplink, depending on the network base station implementation and duplexing mode. In a further embodiment, the network base station may obtain channel state information on the second group of antennas by adding four-CRS signaling in a low density pattern. A high-density, high-overhead pattern of reference symbols may correspond to pilot signaling aimed at good channel estimation, including amplitude and phase on a subcarrier basis, and demodulation at the UE. A low density, low overhead pattern of reference symbols may correspond to pilot signaling aimed at enabling the UE to perform channel measurements for feedback. Channel measurements for feedback may vary much more slowly than channel measurements for demodulation, so a lower density of reference symbols may be sufficient.

In FIG. 4, in another embodiment in which employment of CRS 402 and DRS 404 may be beneficial to achieve a good trade-off between performance gain and pilot overhead, a combined CRS 402 and DRS 404 demodulation scheme may be used to deal with an added number of transmitter antennas due to coordinated multi-point transmission. In one embodiment, a group of network base stations with four transmitter antennas may be deployed, with two or more network base stations coordinating to serve a UE. The UE may rely on the CRS 402 for estimating a first effective channel sub-matrix corresponding to a first set of data streams transmitted from a common antenna set as the ones of the serving base station to which the UE is attached. The UE may rely on the DRS 404 for estimating a second effective channel matrix corresponding to a second set of data streams from a dedicated antenna set such as the antennas from all the other network base stations. In this embodiment, the common antenna set and the dedicated antenna set may be distinct. In an alternate embodiment, the common antenna set and the dedicated antenna set may have at least one antenna in common. For example, the dedicated antenna set may encompass the common antenna set partially or completely.

The UE may use DRS 404 to increase the number of streams to be demodulated by the UE when served by multiple coordinated points. In an OFDM subframe, some UE may be configured to use multiple point (MP)-multiple input multiple output (MIMO) and other UE may operate in a single-point (SP)-MIMO. The UE, operating in SP-MIMO, may use the reference symbol structures with four CRS 402. For the UE operating in MP-MIMO mode, a second network base station may participate in the transmission. The involved set of multiple points may be different for each user and thus differ from UE to UE. The pairing may be performed dynamically. The second point may transmit the signal using DRS, which may support MP-MIMO on an individual basis with more flexibility.

Various levels of co-operation may be supported using CRS 402 and DRS 404. In limited co-operation, network base stations may decide precoding strategy independently, but exchange data. The connected network base station may signal with CRS 402 and second network base station may signal with DRS 404. In fast cell switching, if the connected network base station is selected, a CRS signal may be used and, if second network base station is selected, a DRS signal may be used. In "full" co-operation, participating network base stations may exchange data and jointly determine precoding weights to perform co-operative beamforming.

In both single point and multi-point operations, a multi-user operation may be supported by sharing the data streams among multiple users. For example, one or more base stations may transmit one stream using CRS 402 to one user and another stream using DRS 404 to another user. An effective channel obtained from both CRS 402 and DRS 404 may correspond to the "desired" channel, plus any information on the 'interferer' channel. Hence, in one mode of operation, the UE may obtain desired channel information exclusively from CRS 402, where the channel corresponds to data streams targeted to that UE, and interference channel information exclusively from DRS 404, or vice versa. Alternatively, the UE may obtain desired channel information from both CRS 402 and DRS 404 and similarly interference channel information may be obtained from both CRS 402 and DRS 404. Such knowledge of interfering channel may significantly improve performance, using minimum mean squared error-interference cancellation (MMSE-IC) or maximum-likelihood decoding of the desired stream or streams, if a UE receiver supports these implementations.

Multiple transmission points, or base stations may transmit to multiple UE, and each UE may receive its streams on both CRS 402 and DRS 404. Further, the common antenna sets and the dedicated antenna sets may be from one or more base stations. The assignment of the antenna sets to CRS 402, DRS 404 and base stations may be influenced by various factors like performance; the feedback types supported between UE and base stations; exact type of multi-point operation, such as level of coordination and exchange of information between base stations and UE channel conditions, cell-edge or otherwise; and scheduling restrictions at the base station.

In each of the embodiments described, a UE may use the knowledge of the transmission mode using CRS and DRS to feedback the corresponding spatial parameters conditioned on such a mode. The base station may explicitly instruct a UE to do so. These parameters may include one or more of the precoding matrices $V_{ij}$, the complete precoding matrix V, powers applied to each stream, and a modulation and coding scheme (WS) to be applied on different streams. Further, these parameters may be requested for a part of the frequency band, a set of frequency bands, or the whole transmission bandwidth, where a frequency band is a contiguous set of OFDM subcarriers. A set of transmission modes may be pre-defined, to be understood as operable modes in the specification by the base station and the UE, by different ranks, number of streams, and different parameters defined before, such as $N_s^{CRS}$, $N_T^{DRS}$, multi-point or single-point, and single-user or multi-user operation. The UE may feedback, possibly on a long term basis, the preferred choice of such modes based on its channel condition, receiver implementation, and other criteria. The base station may receive this feedback and use the feedback as a recommendation for scheduling a corresponding mode for that UE.

Figure 10:
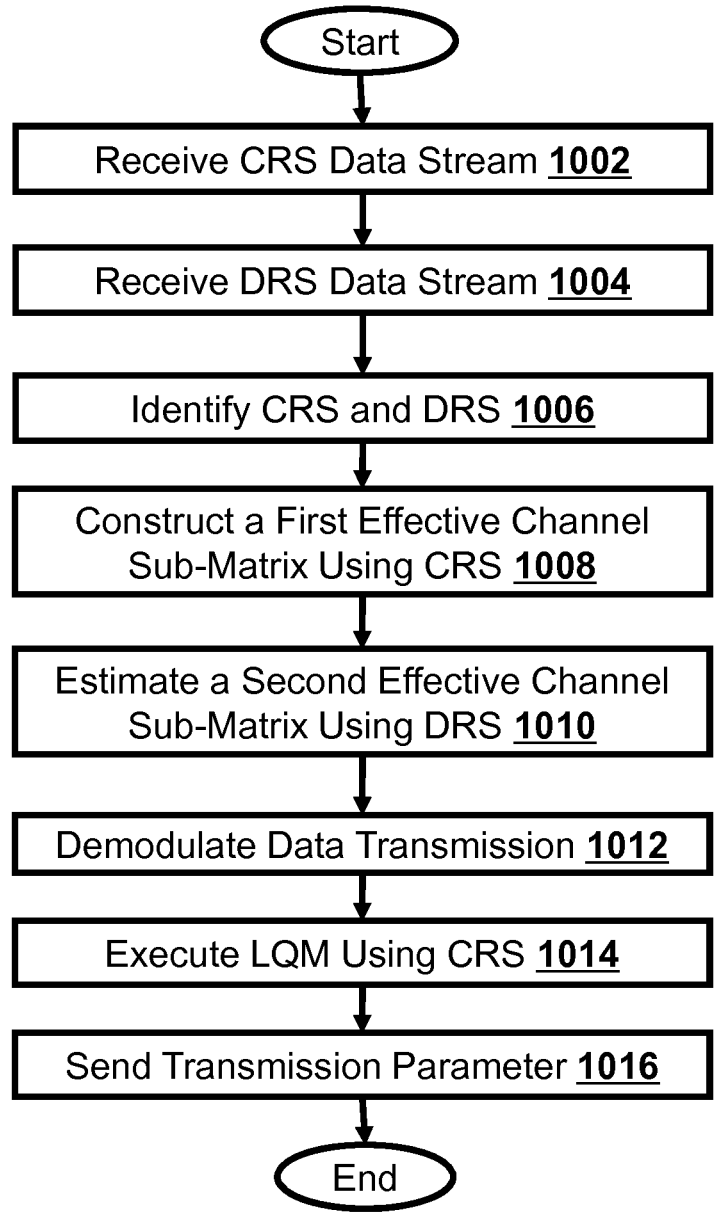
FIG. 10 illustrates, in a flowchart, one embodiment of a method for demodulating a data transmission using reference symbols.

FIG. 10 illustrates, in a flowchart, one embodiment of a method 1000 for demodulating a data transmission using reference symbols. The UE may receive a plurality of data streams intended for a single UE. The UE may receive a data stream encoded with at least one CRS from the common antenna set of a first network base station (Block 1002). The UE may receive a data stream encoded with at least one DRS from the dedicated antenna set of a network base station (Block 1004). The network base station sending the data stream encoded with the at least one DRS may be the first network base station or a second network base station. The UE may identify the at least one CRS and the at least one DRS 404 (Block 1006). The UE may construct an effective channel matrix corresponding to at least one data stream based on the at least one CRS and the at least one DRS. The UE may construct the effective channel matrix by constructing a first effective channel sub-matrix based on the at least one CRS (Block 1008) and estimating a second effective channel sub-matrix based on the at least one DRS (Block 1010). The UE may demodulate the data transmission using the effective channel matrix (Block 1012). The UE may execute a link quality measurement (LQM) of the data transmission using the CRS (Block 1014). The UE may provide feedback by sending a transmission parameter based on the LQM result to network base station 106 (Block 1016).

FIG. 11 illustrates, in a block diagram, one embodiment of an effective channel 1100. The effective channel 1100 may have a desired channel 1110 and an interference channel 1120. The desired channel 1110 may be described by a set of phase data 1112 and a set of amplitude data 1114. The interference channel 1120 may be described by a set of phase data 1122 and a set of amplitude data 1124.

FIG. 12 illustrates, in a block diagram, one embodiment of a LQM feedback 1200. The LQM feedback 1200 may have a precoding matrix index (PMI) 1210, a modulation and coding scheme (MCS) index 1220, a channel quality indicator (CQI) 1230, and a rank indication 1240. The PMI 1210 may be a set of parameters to be implemented when precoding the data transmission. The MCS index 1220 may be an indication of which MCS is being used to modulate the downlink transmission. The CQI 1230 may be a measurement of the communication quality of wireless channels. The rank indication 1240 may be an indication of the number of data streams that may be supported by the effective channel.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments of the invention are part of the scope of this invention. For example, the principles of the invention may be applied to each individual user where each user may individually deploy such a system. This enables each user to utilize the benefits of the invention even if any one of the large number of possible applications do not need the functionality described herein. In other words, there may be multiple instances of the electronic devices each processing the content in various possible ways. It does not necessarily need to be one system used by all end users. Accordingly, the appended claims and their legal equivalents should only define the invention, rather than any specific examples given.

We claim:

1. A method for receiving and demodulating data, the method comprising,
receiving at least one common reference symbol in a user communication device;
receiving at least one dedicated reference symbol in the user communication device;
determining a first effective channel corresponding to a subcarrier and determining a second effective channel corresponding to the subcarrier,
the first effective channel corresponding to a first set of data streams on the subcarrier based on one or more common reference symbols but not based on dedicated reference symbols, and the second effective channel corresponding to a second set of data streams on the subcarrier based on one or more dedicated reference symbols but not based on common reference symbols;
demodulating a data transmission corresponding to the first set of data streams or to the second set of data streams using the corresponding effective channel;
receiving the at least one common reference symbol from a first base station; and
receiving the at least one dedicated reference symbol from a second base station.

2. The method of claim 1, further comprising demodulating the data transmission corresponding to both the first set of data streams and the second set of data streams using the corresponding effective channel.

3. The method of claim 1, further comprising:
the first data stream intended for a first user communication device;
the second data stream intended for a second user communication device; and
demodulating the data transmission intended for the first user device using the corresponding effective channel, wherein the user communication device corresponds to the first user communication device.

4. The method of claim 1, further comprising:
executing a link quality measurement using the at least one common reference symbol; and
sending a transmission parameter based on the link quality measurement.

5. The method of claim 4, wherein the link quality measurement is at least one of a precoding matrix index, a modulation and coding scheme index, a channel quality indicator and a rank indication.

6. The method of claim 1, further comprising:
executing a link quality measurement using the at least one dedicated reference symbol; and
sending a transmission parameter based on the link quality measurement.

7. A method for transmitting data in a wireless network, the method comprising:
transmitting a first set of data streams on a subcarrier from a common antenna set via a first effective channel on the subcarrier wherein the first effective channel is able to be constructed based on one or more common reference symbols but not based on dedicated reference symbols; and
transmitting a second set of data streams on the subcarrier from a dedicated antenna set via a second effective channel on the subcarrier able to be estimated based on one or more dedicated reference symbols but not based on common reference symbols, the first effective channel and the second effective channel constituting corresponding effective channels on the subcarrier, the first effective channel usable for demodulating the first set of data streams and the second effective channel usable for demodulating the second set of data streams;

wherein a first base station has an antenna of the common antenna set and a second base station has an antenna of the dedicated antenna set.

8. The method of claim 7, wherein the common antenna set and the dedicated antenna set are distinct from each other.

9. The method of claim 7, wherein the common antenna set and the dedicated antenna set have at least one antenna in common.

* * * * *